US007548863B2

(12) United States Patent
Kida et al.

(10) Patent No.: US 7,548,863 B2
(45) Date of Patent: Jun. 16, 2009

(54) ADAPTIVE CONTEXT SENSITIVE ANALYSIS

(75) Inventors: Yasuo Kida, Palo Alto, CA (US); Michi Iwasaki, Kanagawa-ken (JP); Keisuke Hara, Kawasaki (JP); Takumi Takano, Tokyo (JP)

(73) Assignee: Apple Inc., Cupertino, CA (US)

( * ) Notice: Subject to any disclaimer, the term of this patent is extended or adjusted under 35 U.S.C. 154(b) by 620 days.

(21) Appl. No.: 10/213,925

(22) Filed: Aug. 6, 2002

(65) Prior Publication Data
US 2004/0030543 A1   Feb. 12, 2004

(51) Int. Cl.
G10L 21/00   (2006.01)

(52) U.S. Cl. ............. 704/277; 704/270; 704/231; 704/9; 704/2

(58) Field of Classification Search .......... 704/277, 704/231, 278, 270, 9, 2
See application file for complete search history.

(56) References Cited

U.S. PATENT DOCUMENTS

| | | | | |
|---|---|---|---|---|
| 5,325,298 | A * | 6/1994 | Gallant | 704/9 |
| 5,497,319 | A * | 3/1996 | Chong et al. | 704/2 |
| 6,360,227 | B1* | 3/2002 | Aggarwal et al. | 707/102 |
| 6,836,760 | B1* | 12/2004 | Bellegarda et al. | 704/257 |
| 7,155,668 | B2* | 12/2006 | Holland et al. | 715/513 |
| 2001/0044724 | A1* | 11/2001 | Hon et al. | 704/260 |
| 2002/0031254 | A1* | 3/2002 | Lantrip et al. | 382/154 |
| 2002/0052740 | A1* | 5/2002 | Charlesworth et al. | 704/220 |
| 2002/0169592 | A1* | 11/2002 | Aityan | 704/2 |
| 2003/0204492 | A1* | 10/2003 | Wolf et al. | 707/3 |

FOREIGN PATENT DOCUMENTS

JP   11-045241   2/1999

* cited by examiner

*Primary Examiner*—Qi Han
(74) *Attorney, Agent, or Firm*—Schwegman, Lundberg & Woessner, P.A.

(57) ABSTRACT

A method, apparatus, system, and signal-bearing medium that converts input data, such as speech or phonetic characters, to text by finding documents that are similar to the input data and using the similar documents to create a customized dictionary including a weighted list of words found in the similar documents. The words that are weighted higher may have a higher probability of being used in the input data, so words in the converted text are chosen based on the weighted list. A vector space model may be used to search for the similar documents.

47 Claims, 4 Drawing Sheets

ADAPTIVE CONTEXT SENSITIVE ANALYSIS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the conversion of phonetic characters to written text and more particularly to converting words that are pronounced the same but written differently.

BACKGROUND

The Japanese written language uses over 10,000 characters, called Kanji, which are not phonetically based. This large number of characters poses challenges for efficient text entry in computers. A common method of entering Japanese text is for the user to type text in phonetic characters, called Kana, and for the computer to convert the Kana characters into Kanji text using a process called Kana-Kanji conversion.

The Kana-Kanji conversion is a complex process. Recent Kana-Kanji conversion engines employ grammatical analysis, for example adjectives can come before nouns, as well as semantic analysis, for example "summer" can mean "hot temperature," but is not likely to mean "spicy hot." The Kana-Kanji conversion shares a very similar nature with character or voice recognitions in that for a given input there are multiple possible results, and the conversion process needs to rank the possible results in order to present the most probable output to the user. The output can be a wrong result, which is referred to as a conversion error. The frequency of conversion errors is measured by calculating the number of correctly converted words divided by the total number of words converted. Conversion accuracy is often the most important factor when a user chooses between Kana-Kanji conversion engines, and recent conversion engines have a conversion accuracy of 96-97%.

One class of conversion errors is referred to as the context dependent class. An example of a context dependent error occurs with different words that have the same pronunciation, and thus the same Kana phonetic character, but multiple Kanji characters depending on the context. For example, the Japanese phonetic sound "sousha" can mean "player" of musical instruments or "runner." Both are pronounced "sousha," but are written differently. If a user types in Kana: <the "sousha" of the piano was Mary>, the conversion engine's semantic analysis is able to determine that the Kana "sousha"should be converted to the Kanji character meaning "player" and not "runner" because of the context of "sousha" with "piano." In contrast, if the user types in Kana: <The "sousha" was Mary>, the conversion engine's semantic analysis does not have proper context in which to interpret "sousha" and must make an arbitrary guess for the Kanji character, which may be incorrect.

Another common conversion error occurs with names, which may be pronounced the same but written differently. For example, a common Japanese name "Keiko" can be written more than ten different ways. If the user knows two people named Keiko, one the user's friend and the other the user's boss, the user might want to compose emails to both and type in Kana: <Hi, "Keiko", let's go skiing this weekend> and <"Keiko", let's talk about the project schedule>. The user would like the conversion engine to convert the first "Keiko" to the Kanji character associated with a friend named Keiko and the second "Keiko" to the Kanji character associated with a boss named Keiko. Unfortunately, the grammatical and semantic analysis used by existing conversion engines is unable to choose the correct Kanji character because the existing conversion engines do not know that one "Keiko" goes skiing while another "Keiko" talks about project schedules.

Although the above problem has been described in terms of Kana and Kanji, it applies equally to any language where different written words have identical pronunciations or identical phonetic representations. For example, the English written words "main" and "mane" have identical pronunciations. Semantic information is unhelpful in analyzing the spoken sentences: "The main was cut" versus "The mane was cut" where "main" refers to a pipe and "mane" refers to an animal's hair.

Since purchasers of conversion engines make buying decision based on conversion accuracy, providing a solution that performs more accurate conversion is critically important.

SUMMARY

A method, apparatus, system, and signal-bearing medium are provided that in an embodiment converts input data, such as speech or phonetic characters, to text by finding documents that are similar to the input data and using the similar documents to create a customized dictionary including a weighted list of words from the similar documents. The words that are weighted higher may have a higher probability of being used in the input data, so words in the converted text are chosen based on the weighted list. In an embodiment, a vector space model may be used to search for the similar documents.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention.

However, it is understood that the invention may be practiced without these specific details. In other instances, well-known circuits, structures and techniques have not been shown in detail in order not to obscure the invention.

Figure 1:
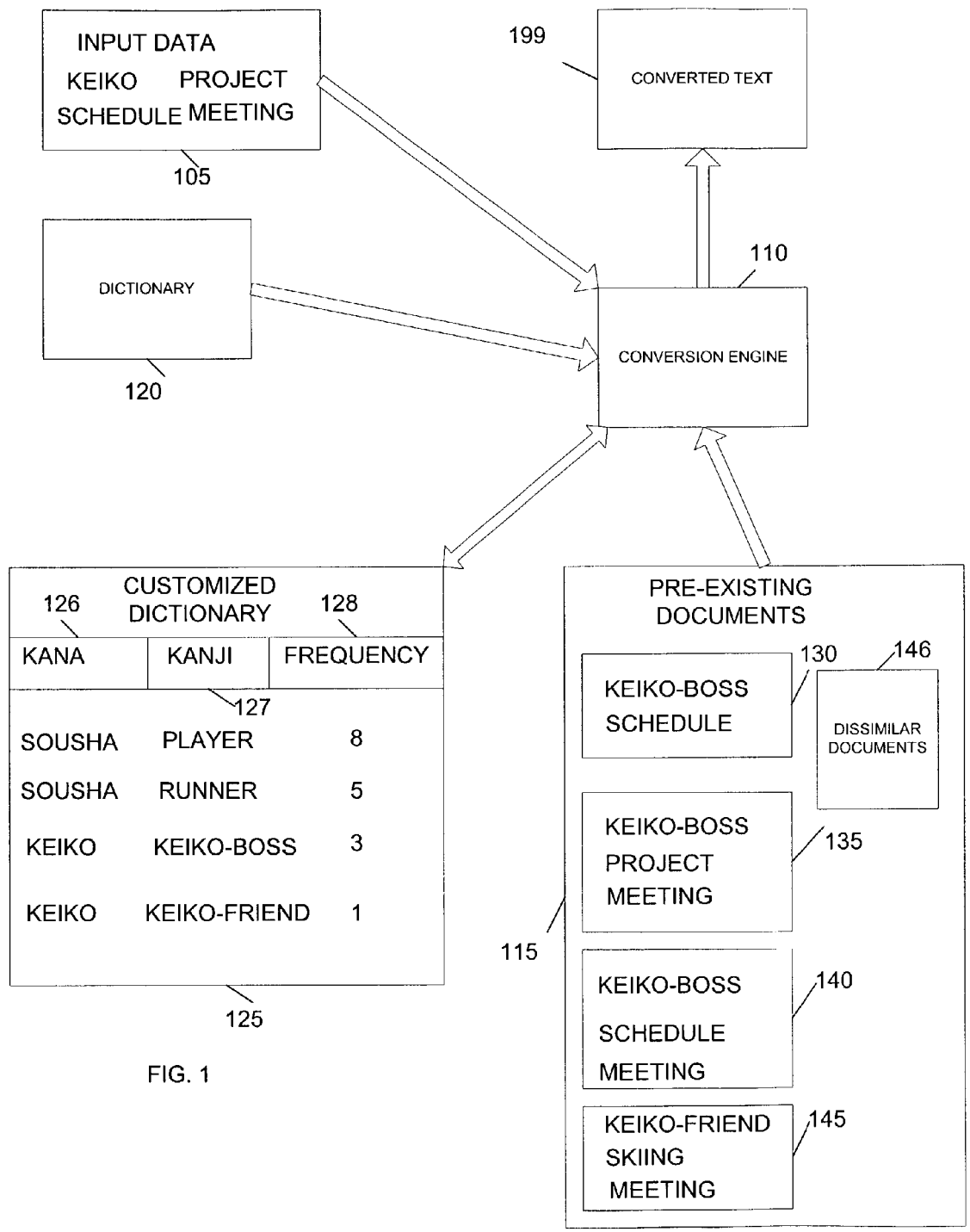
FIG. 1 depicts a block diagram of example components of an embodiment of the invention.

FIG. 1 depicts a block diagram of example components of an embodiment of the invention. Illustrated are input data 105, a conversion engine 110, pre-existing documents 115, a dictionary 120, a customized dictionary 125, and converted text 199.

Input data 105 comprises data that a user wishes to have converted. In an embodiment, the input data 105 includes phonetic characters, such as Kana, that the user wishes to have converted into Kanji. In another embodiment, the input data 105 includes a representation of spoken Japanese associated with a speech-to-text application. In another embodiment, the input data includes a representation of spoken English or any other language associated with a speech-to-text application, and this representation may be in any form, such as ordinary words or words tagged with part of speech. In the example shown, the input data 105 includes "Keiko," "project," "schedule," and "meeting," which represent Kana phonetic characters.

The conversion engine 110 reads and converts the input data 105 into the converted text 199 using the dictionary 120, the customized dictionary 125, and the pre-existing documents 115. The conversion engine 110 creates a vector that represents the input data 105 and uses the vector to search the pre-existing documents 115 for a subset of documents that are similar to the input data 105, as further described below with reference to FIGS. 2 and 3.

In an embodiment, the conversion engine 110 may be a stand-alone application. But, in another embodiment, the conversion engine 110 may be part of a utility that converts phonetic representations of characters entered via a Kana keyboard or any other input method into Kanji characters. In still another embodiment, the conversion engine 110 may be part of a speech-to-text application that converts oral speech or a representation of oral speech into character text. The conversion engine 110 is not restricted to the Japanese language, and may be used with any appropriate language.

The pre-existing documents 115 may include documents that the user has previously written, but in another embodiment, the pre-existing documents 115 may include any set of documents that the user wishes to use as input to the conversion engine 110. In the example shown, the pre-existing documents 115 includes documents 130, 135, 140, 145, and 146. Documents 130, 135, 140, and 145 are documents that the conversion engine 110 has determined are similar or close to the input data 105 while dissimilar documents 146 are documents that the conversion engine 110 has determined are not similar to the input data 105. The technique that the conversion engine 110 uses to separate similar documents from dissimilar documents is further described below with reference to FIGS. 2 and 3.

Document 130 includes the Kanji characters "Keiko-boss" and "schedule." Document 135 includes the Kanji characters "Keiko-boss," "project," and "meeting." Document 140 includes the Kanji characters "Keiko-boss," "schedule," and meeting. Document 145 includes the Kanji characters "Keiko-friend," "skiing," and "meeting." The use of "Keiko-boss" versus "Keiko-friend" is intended to represent that the Kana or phonetic representation of "Keiko" has a different corresponding Kanji character depending on the relationship of the person named "Keiko" to the speaker or user. For example, the Kanji character is different depending on whether Keiko is the user's friend or the user's boss.

Although the documents 130, 135, 140, and 145 are illustrated to include Kanji characters, in another embodiment they may include characters in any language. For example, many languages contain words that have identical pronunciations and identical phonetic representations within a speech processor (e.g., a speech-to-text application) but different written forms.

The dictionary 120 includes a list of phonetic representations and respective written characters along with their relative frequencies, part of speech information (e.g. noun, verb, adjective, etc.) and semantic information (e.g. the word piano is usually used in the context of music). The contents of the dictionary 120 are often called a weighted list because the list is weighted by the relative frequencies. In an embodiment, multiple dictionaries may be present with different relative frequencies based on the application that uses the dictionary. For example, while some words may be rarely used in ordinary conversation, they might be frequently used in a legal or medical application. In another embodiment, the dictionary 120 may include more or fewer items.

The customized dictionary 125 includes a Kana field 126, a Kanji field 127, and a frequency field 128. In another embodiment unrelated to Kana-Kanji conversion, the Kana field 126 may be replaced by a phonetic representation field and the Kanji field may be replaced by a text field. The customized dictionary 125 may also include part of speech information, semantic information, and other appropriate fields.

The customized dictionary 125 includes the weighted list of the dictionary 120 with the relative frequencies modified by the comparison of the input data 105 to the pre-existing documents 115, as further described below with reference to FIGS. 2 and 3. Words that are used more frequently in the similar subset of the pre-existing documents 115 have a higher frequency 128 in the customized dictionary 125, and words that are used less frequently in the similar subset of the pre-existing documents 115 have a lower frequency 128 in the customized dictionary 125. For example, "Keiko-boss" is used three times in the similar documents 130, 135, 140, and 145, so "Keiko-boss" has a frequency 128 of "3" in the customized dictionary 125. "Keiko-friend" is used once in the similar documents 130, 135, 140, and 145, so "Keiko-friend" has a frequency of "1" in the customized dictionary 125.

Although the example shown for the customized dictionary 125 has entries in the frequency 128 corresponding exactly to the number of times the words are used in the similar existing documents, in another embodiment, the frequency 128 is relative or proportional. In yet another embodiment, the frequency 128 isn't present and may be reflected only in the order of the entries in the customized dictionary 125. In an embodiment, a "total score of conversion" is based on the frequency 128 as illustrated below. When an input data can be converted to two possible results: "B1 B2 B3 B4 B5" and "C1 C2 C3 C4 C5" where each of B1, B2, B3, B4, B5, C1, C2, C3, C4, and C5 is a word, the total score of conversion is defined as: $f(B1)+f(B2)+f(B3)+f(B4)+f(B5)+cnn(B12)+cnn(B23)+cnn(B34)+cnn(B45)$.

In the above equation, $f(B1)$ is the frequency of word B1; $f(B2)$ is the frequency of word B2; $f(B3)$ is the frequency of word B3; $f(B4)$ is the frequency of word B4; and $f(B5)$ is the frequency of word B5. Also in the above equation, $cnn(B12)$ is how often parts-of-speech B1 and B2 come together, e.g. an adjective and a noun can connect very easily; $cnn(B23)$ is how often parts-of-speech B2 and B3 come together; $cnn(B34)$ is how often parts-of-speech B3 and B4 come together; and $cnn(B45)$ is how often parts-of-speech B4 and B5 come together. For some input data, using the total score of conversion will yield more accurate results than choosing a word based on the frequency 128 alone.

The converted text 199 includes representations of written characters in the language of interest, which the conversion engine 110 creates from the input data 105 using the dictionary 120, the customized dictionary 125, and the pre-existing documents 115, as previously described above.

Figure 2:
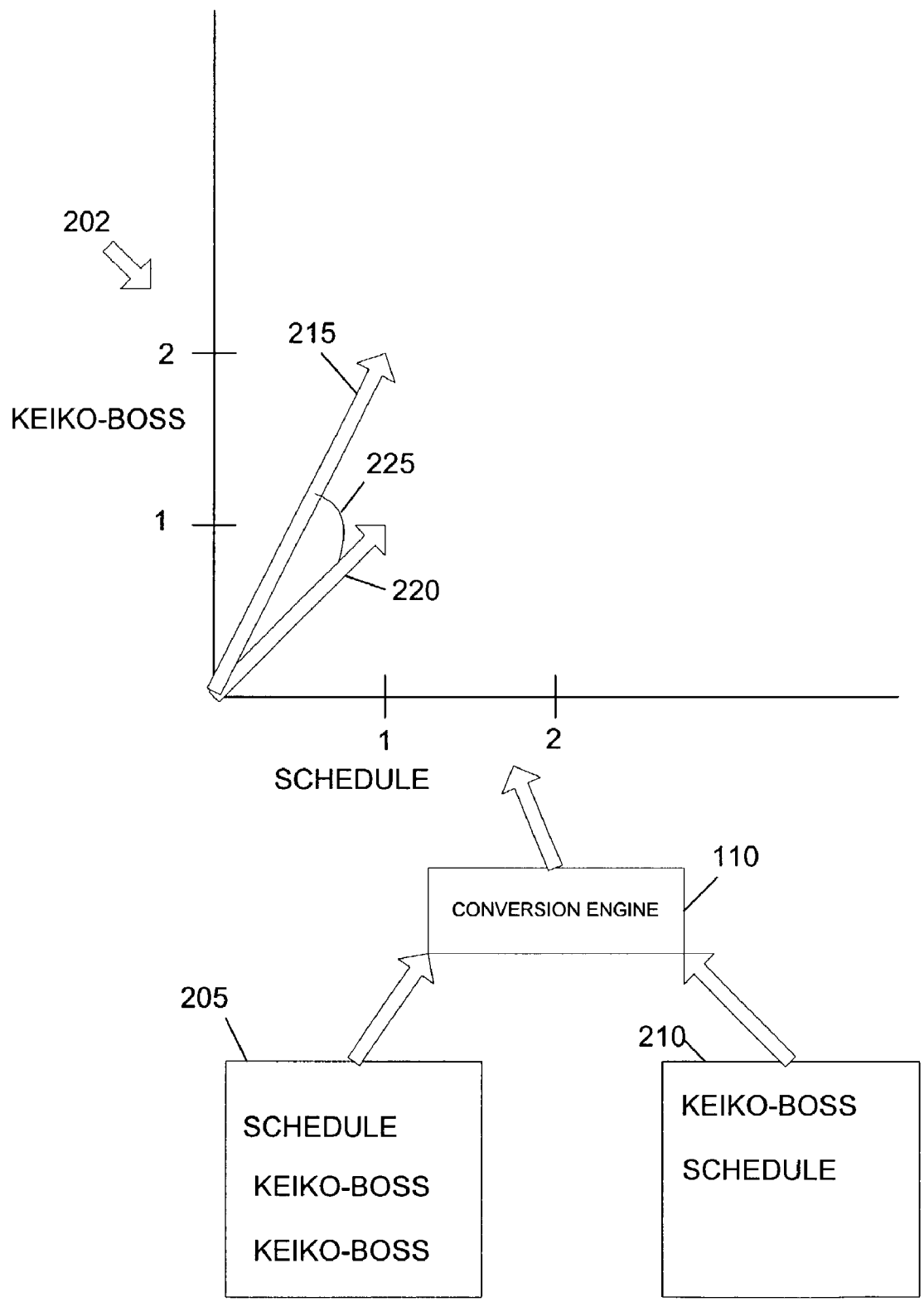
FIG. 2 depicts a pictorial representation of example documents and their associated example vectors, according to an embodiment of the invention.

FIG. 2 depicts a pictorial representation of example documents and their associated example vectors, according to an embodiment of the invention. The conversion engine 110 compares the similarity or closeness of one document to another using technology called a vector space model. In a vector space model, the conversion engine 110 represents the document with an n-dimensional vector, which is a data structure containing the unique words from the document and the number of times the unique words appear. Each dimension in the n-dimensional vector represents one of the unique words with "n" being an integer representing the number of unique words.

In the example of FIG. 2, the document 205 contains three words: "schedule," "Keiko-boss," and "Keiko-boss" and the document 210 contains two words: "Keiko-boss" and "schedule." Both document 205 and document 210 contain two unique words, so the conversion engine 110 represents both document 205 and document 210 by two-dimensional vectors: vectors 215 and 220, respectively. The vectors 215 and 220 are illustrated in a two-dimensional vector space 202 that has the number of instances in the document of "Keiko-boss" on the vertical axis and the number instances of "schedule" on the horizontal axis. For ease of illustration, documents with only two unique words are shown to create the two-dimensional vector space 202, but in other embodiments, any dimensions and any words may be used. Further, the documents may have the same number or different numbers of unique words.

The conversion engine 110 compares the similarity or closeness of documents by comparing the angle 225 between their vectors. Vectors which have a small angle between them are similar while vectors with a large angle are different. In an embodiment, the conversion engine 110 calculates the cosine of the angle 225 as the inner product of the two vectors normalized (divided) by the products of the vector lengths (the square root of the sums of the squares). When the cosine of the angle is 1, the vectors are identical. When the cosine of the angle is 0, the vectors are orthogonal (they have no words in common). In another embodiment the conversion engine 110 calculates similarity of vectors using Euclidean distance or any other appropriate method.

Cosine Similarity:

$$\cos(\vec{x}, \vec{y}) = \frac{(\vec{x}, \vec{y})}{|\vec{x}||\vec{y}|} = \frac{\sum x_i y_i}{\sqrt{\sum x_i^2} \sqrt{\sum y_i^2}}$$

Euclidean Distance:

$$|\vec{x} - \vec{y}| = \sqrt{\Sigma(x_i - y_i)^2}$$

where $\vec{x}$ and $\vec{y}$ are the vectors being compared.

Once the conversion engine 110 has calculated a number using one of the above techniques, the conversion engine 110 determines whether this number indicates a sufficient similarity between the vectors by determining whether the calculated number falls within a predetermined constant. For example, the conversion engine 110 may decide that when the cosine of the vectors is greater than 0.75, the documents are similar and when the cosine is less than or equal to 0.75, the documents are dissimilar. Any appropriate predetermined constant may be used, and the predetermined constant may be set by the conversion engine 110 or selected by the user. In another embodiment, the conversion engine uses a dynamically changing criteria based on the number of pre-existing documents 115, the number of words in the pre-existing documents 115, a proportion or number of the existing documents that are desired to be similar, or any other appropriate factor.

Because the input data 105 contains data in a different format from the documents 115 (e.g., the input data 105 contains Kana characters while the documents 115 contain Kanji characters, or the input data 105 contains a representation of oral speech while the documents 115 contain text), the input vector of the input data 105 is indirect and is calculated and compared via an iterative process. The indirect comparison of vectors of the documents 115 and the input data 105 uses a concept called "inputted data," which may be understand by reference to the following example where initially the inputted data is empty and the first piece of data in input data 105 is "a":

Inputted data: (empty)
Next piece of input data: "a"

Since there is no inputted data, the vectors of the input data 105 and the documents 115 may not yet be compared and a context-sensitive conversion of "a" may not occur, so the input data 105 is converted (e.g. Kana is converted to Kanji or oral speech is converted to text) without context-sensitive considerations to "A." The next piece of data in input data 105 is "b," yielding:

Inputted data: "A"
Next piece of input data: "b"

The "A" is now used to form the current vector of the input data 105 and is used to improve the analysis for the new input "b" by comparing the current vector of the input data 105 to the vector of the documents 115 and converting "b" to "B." The next piece of input data is "c," yielding:

Inputted data: "A B"
Next piece of input data: "c"

Thus, as each piece of the input data 105 is analyzed, the vector of the input data 105 is updated and improved.

Although an embodiment of the invention as been described in terms of a vector space model, in another embodiment a latent semantic model or any other model that is capable of finding similar documents may be used.

Figure 3:
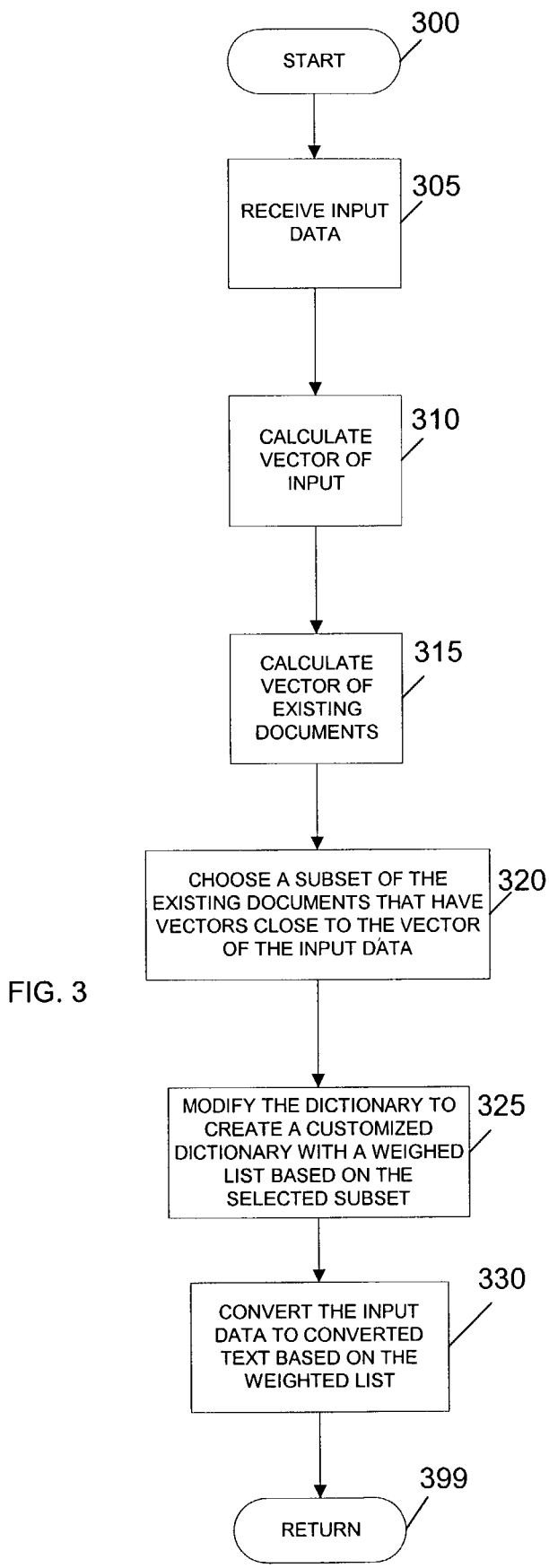
FIG. 3 depicts a flowchart of example processing, according to an embodiment of the invention.

FIG. 3 depicts a flowchart of example processing, according to an embodiment of the invention. Control begins at block 300. Control then continues to block 305 where the conversion engine 110 receives the input data 105.

Control then continues to block 310 where the conversion engine 110 indirectly creates the vector of the input data 105, as previously described above with reference to FIG. 2.

Control then continues to block 315 where the conversion engine 110 finds the pre-existing documents 115 and calculates their vectors, as previously described above with reference to FIG. 2. In another embodiment, the vectors of the pre-existing documents 115 are calculated prior to the start of the conversion of the input data 105 in order to improve the performance of the conversion process. In an embodiment, the vectors of the pre-existing documents 115 are compressed.

Control then continues to block 320 where the conversion engine 110 chooses a subset of the pre-existing documents 115 based on how close their vectors are to the vector of the input data 105, as previously described above with reference to FIG. 2. That is, the conversion engine 110 divides the pre-existing documents 115 into two subsets based on their vectors: a subset that is similar to the input data 105 and another subset that is dissimilar to the input data 105.

Control then continues to block 325 where the conversion engine 110 creates the customized dictionary 125 based on the dictionary 120 and the frequency of the words in the subset of the similar documents previously selected at block 320. Thus, words that are used more frequently in the similar subset of the pre-existing documents 115 have a higher frequency or weight in the customized dictionary 125, and words that are used less frequently in the similar subset of the pre-existing documents 115 have a lower frequency in the customized dictionary 125.

Control then continues to block 330 where the conversion engine 110 converts the input data 105 to the converted text 199 based on the weighted list of words in the customized dictionary 125. When a phonetic representation in the input data 105 maps to more than one word in the customized dictionary 125, the conversion engine 110 selects a word based on the frequency 128. Using the example of FIG. 1, the conversion engine 110 chooses "Keiko-boss" as the Kanji character for the "Keiko" Kana character in the input data 105 because "Keiko-boss" has a frequency of "3" in the customized dictionary 125, which is greater than the frequency of "1" for "Keiko-friend."

The converted text 199 may be optionally added to the documents 115 to be used for reference in future conversions.

Control then continues to block 399 where the function returns.

Figure 4:
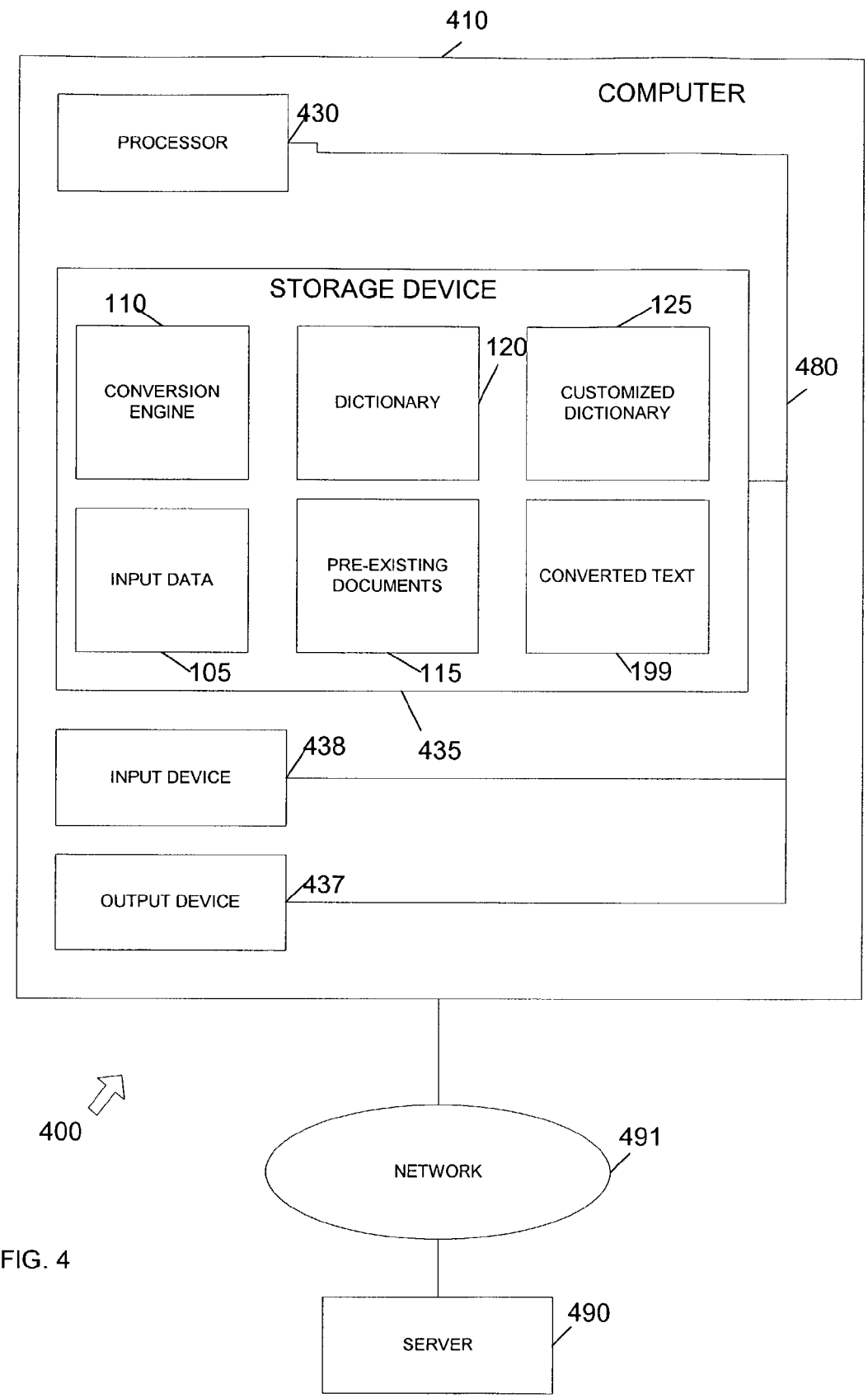
FIG. 4 depicts a block diagram of an example system for implementing an embodiment of the invention.

FIG. 4 depicts a block diagram of a system for implementing an embodiment of the invention.

A system 400 includes a computer 410 connected to a server 490 via a network 491. Although one computer 410, one server 490, and one network 491 are shown, in other embodiments any number or combination of them are present. In another embodiment, the server 490 and the network 491 are not present.

The computer 410 includes a processor 430, a storage device 435, an output device 437, and an input device 438, all connected via a bus 480.

The processor 430 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 430 executes instructions and includes that portion of the computer 410 that controls the operation of the entire computer. Although not depicted in FIG. 4, the processor 430 typically includes a control unit that organizes data and program storage in memory and transfers data and other information between the various parts of the computer 410. The processor 430 receives input data from the input device 438 and the network 491, reads and stores code and data in the storage device 435, and presents data to the output device 437.

Although the computer 410 is shown to contain only a single processor 430 and a single bus 480, the present invention applies equally to computers that may have multiple processors and to computers that may have multiple buses with some or all performing different functions in different ways.

The storage device 435 represents one or more mechanisms for storing data. For example, the storage device 435 may include read only memory (ROM), random access memory (RAM), magnetic disk storage media, optical storage media, flash memory devices, and/or other machine-readable media. In other embodiments, any appropriate type of storage device may be used. Although only one storage device 435 is shown, multiple storage devices and multiple types of storage devices may be present. Further, although the computer 410 is drawn to contain the storage device 435, it may be distributed across other computers, for example on server 490.

The storage device 435 includes the input data 105, the conversion engine 110, the dictionary 120, the customized dictionary 125, and the pre-existing documents 115. The conversion engine 110 includes instructions capable of being executed on the processor 430 to carry out the functions of the present invention, as previously described above with reference to FIGS. 1, 2, and 3. In another embodiment, some or all of the functions of the present invention are carried out via hardware in lieu of a processor-based system. Of course, the storage device 435 may also contain additional software and data (not shown), which is not necessary to understanding the invention.

Although the conversion engine 110, the dictionary 120, the customized dictionary 125, and the pre-existing documents 115 are shown to be within the storage device 435 in the computer 410, some or all of them may be distributed across other systems, for example on the server 490 and accessed via the network 491. In an embodiment, a user enters the input data 105 via the input device 438, but in another embodiment, the input data 105 may be obtained from an alternative source, such as from across the network 491.

The output device 437 is that part of the computer 410 that displays output to the user. The output device 437 may be a cathode-ray tube (CRT) based video display well known in the art of computer hardware. But, in other embodiments the output device 437 may be replaced with a liquid crystal display (LCD) based or gas, plasma-based, flat-panel display. In still other embodiments, any appropriate display device may be used. In yet another embodiment, a speaker may be used. Although only one output device 437 is shown, in other embodiments, any number of output devices of different types or of the same type may be present. In another embodiment, the output device 437 may not be present.

The input device 438 may be a keyboard, Kana keyboard, mouse, trackball, touchpad, touchscreen, keypad, microphone, voice recognition device, or any other appropriate mechanism for the user to input data to the computer 410. Although only one input device 438 is shown, in another embodiment any number and type of input devices may be present.

The bus 480 may represent one or more busses, e.g., PCI, ISA (Industry Standard Architecture), X-Bus, EISA (Extended Industry Standard Architecture), or any other appropriate bus and/or bridge (also called a bus controller).

The computer 410 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, appliances with computational units, and mainframe computers are examples of other possible configurations of the computer 410. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 491 may be any suitable network and may support any appropriate protocol suitable for communication to the computer 410. In an embodiment, the network 491 may support wireless communications. In another embodiment, the network 491 supports hard-wired communications, such as a telephone line or cable. In another embodiment, the network 491 supports the Ethernet IEEE 802.3x specification. In another embodiment, the network 491 is the Internet and supports IP (Internet Protocol). In another embodiment, the network 491 is a local area network (LAN) or a wide area network (WAN). In another embodiment, the network 491 is a hotspot service provider network. In another embodiment, the network 491 is an intranet. In another embodiment, the network 491 is a GPRS (General Packet Radio Service) network. In another embodiment, the network 491 is any appropriate cellular data network or cell-based radio network technology. In another embodiment, the network 491 is an IEEE (Institute of Electrical and Electronics Engineers) 802.11B wireless network. In still another embodiment, the network 491 is any suitable network or combination of networks. Although one network 491 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method comprising:
receiving input data, the input data being data for conversion from a phonetic representation or speech to written text characters of one or more words of a language, the input data having a plurality of data pieces;
calculating, by a processor of a computer via an iterative process, a vector for the input data in a textual format of the language, the iterative process including starting with a first data piece of the input data converted to a selected textual format to form a current vector of the input data and iteratively updating the current vector with a next data piece of the input data using elements of the current vector until all the data pieces are converted into the textual format;
selecting a subset of a plurality of documents based on a closeness of the vector for the input data to a plurality of vectors for text of the plurality of documents, the text of the plurality of documents being written in the language;
determining a frequency of the text in the subset of the plurality of documents; and
converting the input data to a representation of one or more written text characters of the language based on the frequency of the text in the subset of the plurality of documents.

2. The method of claim 1, wherein the input data further comprises speech data.

3. The method of claim 1, wherein the input data further comprises phonetic characters.

4. The method of claim 1, further comprising:
determining the closeness of the vectors by calculating cosines of angles between the vector for the input data and each of the plurality of vectors for text of the plurality of documents.

5. The method of claim 4, wherein the calculating cosines further comprises:
calculating inner products of the vector for the input data and each of the plurality of vectors for text of the documents; and
normalizing the inner products of a length of the vector of the input data and a length of each of the plurality of vectors.

6. An apparatus comprising:
means for receiving input data, the input data being data for conversion from a phonetic representation or speech to written text characters of one or more words of a language, the input data having a plurality of data pieces;
means for calculating, via an iterative process, a vector for the input data in a textual format of the language, the iterative process including starting with a first data piece of the input data converted to a selected textual format to form a current vector of the input data and iteratively updating the current vector with a next data piece of the input data using elements of the current vector until all the data pieces are converted into the textual format;
means for dividing a plurality of documents into a first subset similar to the input data and a second subset dissimilar to the input data based on the vector for the input data, the plurality of documents having text being written in the language;
means for determining a frequency text in the first subset; and
means for converting the input data to a representation of one or more written text characters of the language based on the frequency of the text in the first subset.

7. The apparatus of claim 6, wherein the means for dividing further comprises:
means for calculating a plurality of vectors for each the plurality of documents; and
means for comparing the vector for the input data to each of the plurality of vectors.

8. The apparatus of claim 6, wherein the means for comparing further comprises:
means for determining an angle between the vector for the input data and each of the plurality of vectors.

9. The apparatus of claim 7, wherein the means for comparing further comprises:
means for determining a Euclidean distance between the vector for the input data and each of the plurality of vectors.

10. The apparatus of claim 6, wherein the input data comprises Kana characters.

11. The apparatus of claim 6, wherein the input data comprises phonetic characters.

12. The apparatus of claim 6, wherein the input data comprises speech.

13. A machine-readable storage medium having executable instructions stored thereon, which when executed, causes a machine to perform operations comprising:
receiving input data, the input data being data for conversion from a phonetic representation or speech; to written text characters of one or more words of a language, the input data having a plurality of data pieces;

calculating by a processor of the machine, via an iterative process, an input vector for the input data in a textual format of the language, the iterative process including starting with a first data piece of the input data converted to a selected textual format to form a current vector of the input data and iteratively updating the current vector with a next data piece of the input data using elements of the current vector until all the data pieces are converted into the textual format;

finding a subset of a plurality of documents based on the input vector, the plurality of documents having text being written in the language;

determining a frequency of the text in the subset; and converting the input data to a representation of one or more written text characters of the language based on the frequency.

14. The machine-readable storage medium of claim 13, wherein the operation of finding further comprises operations:

calculating a plurality of vectors for each of the plurality of documents; and comparing the input vector to each of the plurality of vectors.

15. The machine-readable storage medium of claim 13, which when executed by the machine causes the machine to perform further operations comprising:

creating a customized dictionary based on the frequency of words in the subset.

16. The machine-readable storage medium of claim 15, wherein the operation of converting the input data to one or more written characters of the language is further based on the customized dictionary.

17. A method comprising:

finding, by a processor of a computer; at least one document having text that is similar to input data, the input, data being data for conversion from a phonetic representation or speech; to written text characters of one or more words of a language and having a plurality of data pieces, the finding based on the text of the at least one document and the input data converted to a textual format from an iterative process, the iterative process including starting with a first data piece of the input data converted to a selected textual format to form a current format of the input data and iteratively updating the current format with a next data piece of the input data using elements of the current format until all the data pieces are converted into the textual format, the text of the at least one document being written in the language;

creating by the processor a customized dictionary comprising a weighted list of the text that occur in the at least one document; and converting the input data to a representation of one or more written text characters of the language based on the weighted list.

18. The method of claim 17, wherein the input data comprises a phonetic character.

19. The method of claim 17, wherein the input data comprises a representation of speech.

20. The method of claim 17, wherein the input data comprises a Kana character.

21. The method of claim 17, wherein creating the customized dictionary further comprises assigning a higher weight to the text in the weighted list that has a higher probability of being used in the input data.

22. The method of claim 17, wherein creating the customized dictionary further comprises calculating a frequency of the text in the at least one document.

23. An apparatus comprising:

means for finding at least one document having text that is similar to input data, the input data being data for conversion from a phonetic representation or speech to written text characters of one or more words of a language and having a plurality of data pieces, the finding based on the text of the at least one document and the input data converted to a textual format from an iterative process, the iterative process including starting with a first data piece of the input data converted to a selected textual format to form a current format of the input data and iteratively updating the current format with a next data piece of the input data using elements of the current format until all the data pieces are converted into the textual format, the text of the at least one document being written in the language;

means for creating a customized dictionary comprising a weighted list of the text that occur in the at least one document; and means for converting the input data to a representation of one or more written text characters of the language based on the weighted list.

24. The apparatus of claim 23, wherein the input data comprises a phonetic character.

25. The apparatus of claim 23, wherein the input data comprises a representation of speech.

26. The apparatus of claim 23, wherein the input data comprises a Kana character.

27. The apparatus of claim 23, wherein the means for creating the customized dictionary further comprises means for assigning a higher weight to the text in the weighted list that has a higher probability of being used in the input data.

28. The apparatus of claim 23, wherein the means for creating the customized dictionary further comprises means for calculating a frequency of the text in the at least one document.

29. A machine-readable storage medium having executable instructions stored thereon, which when executed, causes a machine to perform operations comprising:

finding by a processor of the machine, at least one document having text that is similar to input data, the input data being data for conversion from a phonetic representation or speech to written text characters of one or more words of a language and having a plurality of data pieces, the finding based on the text of the at least one document and the input data converted to a textual format from an iterative process, the iterative process including starting with a first data piece of the input data converted to a selected textual format to form a current format of the input data and iteratively updating the current format with a next data piece of the input data using elements of the current format until all the data pieces are converted into the textual format, the text of the at least one document being written in the language;

creating a customized dictionary comprising a weighted list of the text that occur in the at least one document; and converting the input data to a representation of one or more written text characters of the language based on the weighted list.

30. The machine-readable storage medium of claim 29, wherein the input data comprises a phonetic character.

31. The machine-readable storage medium of claim 29, wherein the input data comprises a representation of speech.

32. The machine-readable storage medium of claim 29, wherein the input data comprises a Kana character.

33. The machine-readable storage medium of claim 29, wherein the operation of creating the customized dictionary further comprises assigning a higher weight to the text in the weighted list that has a higher probability of being used in the input data.

34. The machine-readable storage medium of claim 29, wherein the operation of creating the customized dictionary further comprises calculating a frequency of the text in the at least one document.

35. A system comprising:
a processor; and
a storage device coupled to the processor, wherein the storage device comprises instructions, which when executed on the processor cause the processor to perform operations that comprise:
finding at least one document having text that is similar to input data, the input data being data for conversion from a phonetic representation or speech to written text characters of one or more words of a language and having a plurality of data pieces, the finding based on the text of the at least one document and the input data converted to a textual format from an iterative process, the iterative process including starting with a first data piece of the input data converted to a selected textual format to form a current format of the input data and iteratively updating the current format with a next data piece of the input data using elements of the current format until all the data pieces are converted into the textual format, the text of the at least one document being written in the language;
creating a customized dictionary comprising a weighted list of the text that occur in the at least one document; and
converting the input data to a representation of one or more written text characters of the language based on the weighted list.

36. The system of claim 35, wherein the input data comprises a phonetic character.

37. The system of claim 35, wherein the input data comprises a representation of speech.

38. The system of claim 35, wherein the input data comprises a Kana character.

39. The system of claim 35, wherein the operation of creating the customized dictionary further comprises assigning a higher weight to text in the weighted list that has a higher probability of being used in the input data.

40. The system of claim 35, wherein the operation of creating the customized dictionary further comprises calculating a frequency of the text in the at least one document.

41. A method of converting input data into text, the method comprising the acts of:
determining a phonetic representation or speech possible text for representations of the input data, the input data being data for conversion, by a processor of a computer to written text characters of one or more words of a language and having a plurality of data pieces, the determining based on the input data converted to a textual format from an iterative process, the iterative process including starting with a first data piece of the input data converted to a selected textual format to form a current format of the input data and iteratively updating the current format with a next data piece of the input data using elements of the current format until all the data pieces are converted into the possible text;
comparing the possible text against text of a set of one or more pre-existing documents, the text of the set of one or more pre-existing documents being written in the language;
selecting at least one of the set of pre-existing documents based on similarity between the possible text and the text of the set of pre-existing documents;
associating by the processor weights with each of the possible text based on the text of the at least one selected pre-existing document; and
for those of the representations having plural possible text, selecting one of the plural possible text based on the associated weights: and
providing the selected text as a representation of one or more written text characters of the language.

42. The method of claim 41, wherein each of the representations of input data is provided as phonetic characters and each of the text of the one or more pre-existing documents is provided with a semantic expression.

43. The method of claim 41, wherein the input data is selected from a set consisting essentially of audio input and textual input.

44. The method of claim 41, wherein the text of the at least one selected pre-existing document is provided as one or more Kanji characters.

45. A method of converting input data into text, the method comprising the acts of:
using a dictionary to determine, by a processor of a computer, text for representations of input data, the input data being data for conversion from a phonetic representation or speech to written text characters of one or more words of a language, a first of the representations being associated with multiple text of the language, the determined text based on the input data converted to a textual format from an iterative process the iterative process including starting with a first data piece of the input data converted to a selected textual format to form a current format of the input data and iteratively updating the current format with a next data piece of the input data using elements of the current format until all the data pieces are converted into the determined text;
selecting a set of one or more pre-existing documents having text similar to the determined text for the representations of the input data, the text of the set of one or more pre-existing documents being written in the language;
assigning by the processor, weights to the multiple text associated with the first representation based, at least in part, on occurrence of the multiple text in the selected set of one or more pre-existing documents; and
converting, in accordance with the assigned weights, the first representation to a first of the multiple text.

46. The method of claim 45, wherein the text of the set of one or more pre-existing documents is provided as one or more Kanji characters.

47. The method of claim 45, wherein the input data is selected from a set consisting essentially of speech data and phonetic characters.

* * * * *